United States Patent [19]
Vishlitzky et al.

[11] Patent Number: 5,761,717
[45] Date of Patent: Jun. 2, 1998

[54] SYSTEM AND METHOD FOR DETERMINING WHAT POSITION IN CACHE MEMORY TO STORE DATA ELEMENTS

[75] Inventors: Natan Vishlitzky; Haim Kopylovitz, both of Brookline, Mass.

[73] Assignee: EMC Corporation, Hopkinton, Mass.

[21] Appl. No.: 639,157

[22] Filed: Apr. 26, 1996

Related U.S. Application Data

[63] Continuation of Ser. No. 354,479, Dec. 12, 1994, Pat. No. 5,513,336, which is a continuation-in-part of Ser. No. 893,509, Jun. 4, 1992, Pat. No. 5,381,539.

[51] Int. Cl.⁶ ......................................................... G06F 12/08
[52] U.S. Cl. ............................. 711/136; 711/160; 711/113
[58] Field of Search ................... 711/133–136, 159–160, 711/113

[56] References Cited

U.S. PATENT DOCUMENTS

| | | | |
|---|---|---|---|
| 4,489,378 | 12/1984 | Dixon et al. | 395/853 |
| 4,607,331 | 8/1986 | Goodrich, Jr. et al. | 711/136 |
| 4,783,735 | 11/1988 | Miu et al. | 711/136 |
| 5,140,690 | 8/1992 | Hata et al. | 395/182.03 |
| 5,283,884 | 2/1994 | Menon et al. | 711/113 |
| 5,293,608 | 3/1994 | Johnson et al. | 711/136 |

FOREIGN PATENT DOCUMENTS 0 359 923 A2   3/1990   European Pat. Off. .

*Primary Examiner*—Matthew M. Kim
*Attorney, Agent, or Firm*—Leanne J. Fitzgerald, Esq.; John M. Gunther, Esq.

[57] ABSTRACT

A cache management system and method monitors and controls the contents of cache memory. A time indication provider provides a time indication signal to a cache indexer, for maintaining a cache index which are stored in cache as well as an indication that a data element must be written to a longer term data storage device. A cache manager is responsible for placing data elements into and removing data elements from the cache memory. The cache manager is responsive to at least one data element stored in cache which must be written to a longer term data storage device, and to the associated time indication, for determining the amount of time that the data element has been stored in cache as well as the average period of time that elapses between a data element being inserted in cache and being removed from cache. Based on a comparison of the average period of time that elapses between a data element being entered into and removed from cache and the amount of time that the data element which is written to a longer term data storage device has been stored in cache, the cache manager determines whether to place the data element in the top of the cache, to allow the data element to remain in cache a longer period of time, or at the bottom of the cache which will cause the date element to be removed from cache more quickly.

18 Claims, 8 Drawing Sheets

SYSTEM AND METHOD FOR DETERMINING WHAT POSITION IN CACHE MEMORY TO STORE DATA ELEMENTS

RELATED APPLICATIONS

This application is a continuation application of Ser. No. 08/354,479 filed Dec. 12, 1994, now U.S. Pat. No. 5,513,336 issued Apr. 30, 1996, which is a continuation-in-part of U.S. patent application Ser. No. 07/893,509, filed June 4, 1992 now U.S. Pat. No. 5,381,539 issued Jan. 10, 1995, by the same inventors as herein, assigned to the same assignee as the present invention, and fully incorporated herein by reference.

FIELD OF THE INVENTION

This invention relates to computer systems and more particularly, to a system and method for managing temporary, relatively high speed memory in which is stored data awaiting writing to a longer term storage media.

BACKGROUND OF THE INVENTION

Computer systems which are coupled to a large amount of data storage may spend a great deal of CPU and BUS time reading and writing data to and from the storage devices. Reading data and writing to and from disk drives or similar long term data storage devices tremendously impacts and decreases performance and throughput of data storage systems.

Accordingly, many data storage systems now include high speed, short term cache memory which can be accessed much more rapidly by a host system without the delays associated with the mechanical motion and time delay inherent in a long term storage device such as a disk drive. Thus, if data requested by a host is stored in cache instead of on the disk drive, system performance can be increased tremendously. Cache memory, however, is a finite resource. It is costly and accordingly, must be properly managed to yield its intended benefit.

Prior art systems or methods aimed at managing cache memory include a system disclosed in U.S. Pat. No. 4,489,378 wherein the system prefetches a selected number of records in anticipation that the data will soon be requested. Several problems, however, exist with such a system. For example, the system has no knowledge of what is already stored in cache and thus, the system must make real time decisions as to whether or not a sequential data access is being performed.

Further, the system prefetches a selected number of data elements without regard for what is currently in cache. Most importantly, such a system is not efficient when used with a multi-tasking/multi-processor system wherein a storage device controller is handling requests in a multiplexed fashion from many hosts. In such a case, multiplexed sequential data access would appear as a non-sequential or random data requests to the cache manager and the desired data would not be present in the cache due to the non-sequential appearance of the task.

An additional prior art system for controlling or managing cache memory is disclosed in U.S. Pat. No. 4,853,846 wherein a cache memory directory is split up into as many segments as there are processors or hosts which are accessing the memory. Given the associated high cost of cache memory, such a system results in expensive, duplicative cache memories. In addition, such a system is also incapable of handling multi-tasking systems given that the system requires a dedicated cache directory associated with each accessing host or processor.

Further, both referenced prior art systems as well as other similar prior art systems are not capable of allowing the user to establish selectable thresholds or criteria to determine the threshold for determining that a sequential task is indeed in progress, the number of data records to prefetch once a sequential task has been identified, and the size of cache memory to allocate to a given task.

Cache memory is also utilized when data is being written from a host computer to a long term data storage device such as a disk drive. In such systems, data may be written to short term, high speed, cache memory in which it is temporarily held with an indication that this data must be written to longer term data storage when the data storage system finds it convenient or otherwise has the time to perform this operation. When utilizing short term, high speed memory, such as cache, to temporarily hold write pending data, memory storage locations are removed from the main pool of memory storage locations generally available to the data storage system in which data may be held pending use by the host.

Accordingly, when data which is "write pending" has been written to a longer term storage media, the memory locations containing the now written data must be returned to the main memory pool as quickly as possible in order to ensure that enough memory remains available for data which is being transferred from the longer term data storage device, such as a disk drive, to the memory, awaiting retrieval by a host system.

Further, due to the random usage of cache memory, cache memory addresses containing data which have recently been written to longer term storage media must be returned to the main memory pool in such a manner as to ensure that if the data which has recently been written to longer term storage media will not be utilized, those cache memory locations should be made available as quickly as possible to the main cache pool. If, however, it is possible that the data having just previously been written to longer term storage media may be utilized by the host, then this data should be retained in memory for a period of time sufficient to ensure its accessibility to the host.

Prior cache management or data processing systems, however, have not utilized methods to control useability of short term, cache memory which contains data to be written or which has recently been written, to longer term data storage media. An additional difficulty exists in those systems which attempt to anticipate data requests by identifying sequential data access "jobs" by looking only for a predetermined number of sequential tracks in cache memory using only the virtual address of the track. Even a pure random data access will cause the data storage system to access data with adjacent addresses in a random manner over a long period of time, thus making the cache management system falsely believe that a sequential data access is in progress when in fact there is not. This false indication that a sequential data access is in progress will cause the cache management system to prefetch additional unnecessary data into the cache which will not be utilized but merely take up valuable and finite cache memory space.

Accordingly, what is needed is a system and method for managing short term memory storage locations which contain data to be written to long term data storage media in such a way as to ensure that the memory addresses are made available to a main memory pool as quickly as possible, without sacrificing or overwriting data which resides in high speed, shorter term memory which may be utilized by a coupled host computer in a relatively short period of time.

SUMMARY OF THE INVENTION

A cache management system and method is disclosed which allows a single cache memory to be utilized in a multi-tasking or multi-processor environment without the need for creating multiple cache directories. Additionally, the cache management system and method allows the user to establish selectable thresholds and criteria for each and every physical or logical storage device coupled to the data processing system, thus allowing the criteria to be selected on a process-by-process basis.

The present cache management system and method monitors and controls addresses of short term cache memory in which are stored data elements awaiting writing to a longer term data storage device such as a disk drive. Once the data elements have been actually written to the data storage device, the present cache management system and method utilizes an indication of the amount of time the data element was in cache as well as an indication of the number of times a data element was accessed in order to determine how long to maintain the data record which has now been previously written to a data storage device in the short term cache memory.

The present cache management system and method also takes into account the length of time that a data element has been in cache or the actual time of data access in relationship to a physically adjacent data element in order to make a determination as to whether or not a sequential data access is in progress.

The present cache management system and method provides for monitoring and controlling the contents of cache memory which is coupled to at least one data storage device. A time indicator outputs a signal including a time indication. The time indication may be in real time or in relative time. A cache indexer maintains a cache index of data elements which are stored in cache pending or awaiting being written to the at least one longer term data storage device and responsive to the time indicator, stores at least one time indication along with each respective data element index maintained in the cache index.

A sequential data access indicator is responsive to the index, to a selectable sequential data access threshold provided by the user, and to a comparison of time indication associated with at least first and second sequential data elements, for determining that a number of sequential data elements have been requested which exceeds the sequential data threshold within a predetermined period of time, thus indicating that at least one occurrence of a sequential data access is in progress by a given process executing on the host, and for providing an indication of that determination.

In response to the indication of a sequential data access in progress provided by the sequential data access indicator, a micro-cache memory in the form of a circular "loop" is established in the main cache memory for each and every process having a sequential data access in progress. Subsequently, a data retrieval requester requests retrieval or prefetching from a data storage device coupled to the system, of up to a user selectable predetermined number of data elements to be prefetched.

In this embodiment, the cache management system further includes a cache data replacer, which is responsive to a user supplied selectable predetermined maximum number of sequential data elements which are to be stored in the cache memory for a given process, for replacing or over-writing the least recently used sequential data elements in excess of the predetermined maximum number of elements established by the process parameters set up by the user.

In a preferred embodiment, the current cache index is maintained in the system-wide global memory, and may be organized by physical or logical data storage device. In such an embodiment, the cache memory is typically a high speed semiconductor memory.

The presently described cache management system also includes a method for monitoring and controlling the contents of cache memory coupled to at least one data storage device. The method includes establishing and maintaining a cache directory including at least an indication of which data elements are currently in the cache memory and which data elements must be written to longer term data storage along with a time indication with each indexed data element indicating what time the data element was placed in cache. User selectable criteria are established including a sequential data access threshold, for providing a predetermined minimum number of data elements stored in the cache memory indicating the occurrence of a sequential data access in progress by at least one host system if the sequential data elements occur with a predetermined period of time.

When the data storage system determines that there is sufficient time to perform various data handling routines, such as writing data from cache to a longer term data storage device, the cache management system of the present invention examines the cache index to determine which data elements must be written to a longer term data storage device by examining whether or not a particular data element includes a write pending indication. Upon discovering data elements with a write pending indication, the cache management system of the present invention causes the data element to be written from cache to the longer term data storage device. The cache fatagement system next determines the period of time that the data element remains in cache, awaiting being written to disk. During the period of time that a data element is in the cache awaiting writing to a longer term data storage device, the data element is stored in a first section of cache memory.

After writing the data element to the longer term data storage device and determining the period of time the data element resided in the first section of the cache memory, the cache management system of the present invention next determines the average elapsed period of time that one or more data elements have spent in a second cache memory section, awaiting final removal from the cache memory entirely. A second section of cache memory is allocated to those data elements which have been written to a longer term data storage device but which, due to the short amount of time they have spent in cache, are maintained in cache memory in the event that a host system may call upon the data again.

According to the method of the present invention, the cache management system next compares the amount of time that a data element, just written to a longer term storage device, has spent in the first section of the cache memory with an average elapsed period of time that a data element spends in the second section of the cache memory, before being discarded. If the period of time which the data element has spent in the first cache memory section is less than the average elapsed period of time that a data element spends in the second cache memory section, then it is likely that the data element may be called upon by a host and accordingly, the data element will be placed in a top most position in the second section of the cache memory, as a last recently used data element. Over time, the last recently used data element will migrate from the "top" to the "bottom" of the second cache memory section and will be discarded in accordance with a least recently used (LRU) algorithm operating in the cache memory system.

If, however, the cache management system determines that the period of time that the data element spent in the first cache memory section is greater than the average elapsed period of time that a data element spends in the second cache memory section, then it is unlikely that a host will access or read the data element and accordingly, the present cache management system and method will place the data element in the hypothetical "bottom" of the second cache memory section as a least recently used data element. Subsequently, the least recently used cache management algorithm operating in the cache management system will discard this data element very quickly and return its cache memory location (s) to the main cache memory pool for use by various processes executing on the data storage system.

The present system and method also scans or monitors the cache directory, and in response to the user selected sequential data access threshold and a time indication comparison between at least first and second detected sequential data elements stored in cache, the method determines that a sequential data access is in progress. In response to a user selectable predetermined number of data elements to be retrieved or prefetched from a data storage device, and to the determination of a sequential data access in progress, the established user selectable predetermined number of data elements are retrieved in response to a retrieval request.

In response to a user selectable predetermined maximum number of sequential data elements to be stored in cache memory, the method sequentially replaces in the cache data elements which exceed the predetermined maximum number established by the process parameters.

An additional feature of the presently disclosed cache manager is a dynamic monitoring and adjustment feature which provides the cache manager with the ability to monitor and dynamically alter several cache manager parameters for each process having a sequential data access in progress and thus, to monitor the effectiveness of the cache management algorithm controlling each and every sequential process, in an attempt to improve on the algorithms.

The dynamic monitoring and adjustment feature of the cache manager continuously monitors the cache index/directory once a sequential process has been detected, to determine whether the tracks or data records which have been prefetched have in fact been used by the host system. The dynamic monitoring and adjustment feature of the present cache manager will accordingly increase the sequential access detection threshold when unused tracks or records are detected, and decrease the detection threshold in response to a large number or long continuous string of used data records or tracks, thus allowing the sequential detection threshold to "float" at the optimum level for each process.

The dynamic monitoring and adjustment feature of the present cache manager also monitors and dynamically adjusts the number of data tracks or records to be prefetched as a function of the number of sequential data tracks or records which have been used. Thus, a large or lengthy sequential process will result in a higher number of prefetched data tracks or records whereas a shorter or smaller sequential process will result in fewer data tracks or records prefetched. Further, as a result of increasing the number of data tracks or records to prefetch, the dynamic monitoring and adjustment feature of the present cache manager will allow the size of the micro-cache memory "loops" for a given process to increase and decrease in size with a corresponding increase or decrease fluctuation in the number of data tracks or records to prefetch for that process.

DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
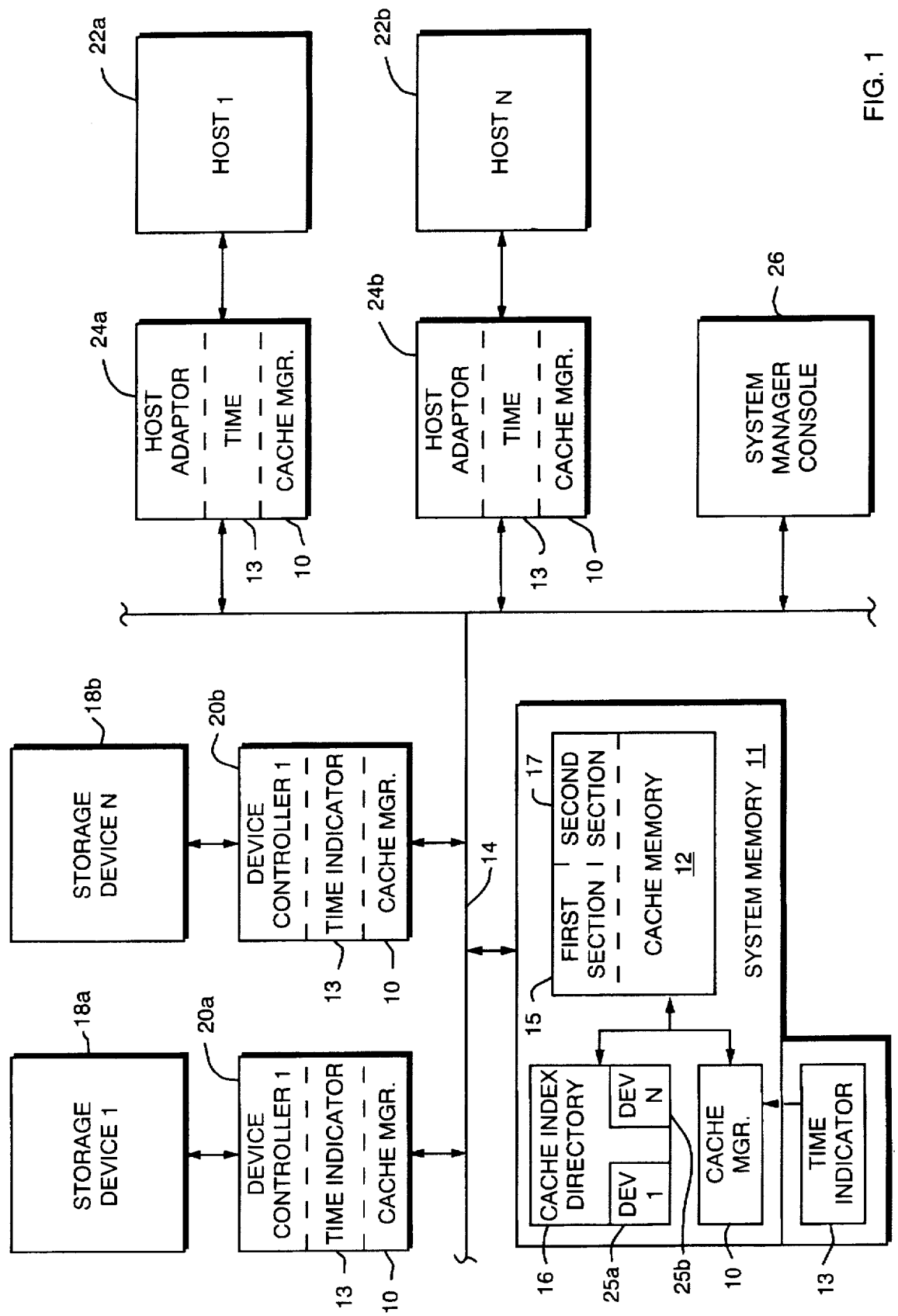
FIG. 1 is a block diagram of the cache management system of the present invention.

An exemplary data storage system including a cache management system for monitoring and controlling the contents of cache memory coupled to at least one data storage device is shown in block diagram form in FIG. 1 and includes cache manager 10. Cache manager 10 is a virtual entity and can be resident in any location such as system memory 11, device controllers 20a–20b and host adapters 24a–24b, or its functionality distributed over one or more of such locations.

Cache manager 10 receives as input, a time indication signal from time indicator 13 which is typically a battery backed-up real time clock located on the device controller 20 or host adapter 24 which is implementing the cache manager function. Other time indication signals including a relative time signal, for example, are also considered to be within the scope of this invention. Cache manager 10 may also be implemented on each device controller 20 to better manager the cache memory locations 12 being maintained and utilized for that particular data storage device, in order to optimize performance.

Cache memory 12 is typically organized as one main pool of cache memory locations. In the preferred embodiment of the present invention, the cache memory is divided into at least first and second sections 15, 17, respectively. The first cache memory section is utilized to store data elements which need to be written to a longer term data storage device such as a disk drive. An indication that the data elements need to be written to a longer term data storage device is maintained in the cache index directory as will be more fully explained below.

The second section 17 of cache memory 12 is used to provide memory storage locations for those data elements which have been written to a longer term data storage device but which, due to the amount of time that they have resided in cache memory, the present cache management system has determined should remain in cache to ensure that the data element is available in the event that a host system wishes to again access the data element.

For example, it has been determined, using empirical data, that if a data element resides in cache more than two seconds (Natan, please verify) without being used by a host, chances are that the data will not be accessed again within a reasonable period of time that would warrant maintaining the data element in cache memory. Since cache memory is a valuable and expensive resource, it is more desirable to remove that, data element from cache memory, and return the cache memory address(es) for use by the main cache memory pool. One process of determining how long to maintain a selected data element in the second section 17 of cache memory will be explained in greater detail below.

An exemplary data storage system for use with the present cache manager typically includes one or more devices such as host/channel adapter boards 24a–24b which are adapted to receive data read/write commands and associated data over one or more communication channels from one or more hosts 22a–22b (not part of the present invention).

The host/channel adapter boards 24a–24b are coupled to cache memory 12 by means of bus 14. Bus 14 is also coupled to one or more data storage device controller/adapter boards 20a–20b which serve to control the reading and writing of data to or from respective longer term data storage devices 18a–18b. Exemplary controller and host adapter boards are described in Applicants' U.S. Pat. No. 5,335,352 entitled Reconfigurable, Multi-Function Disk Controller, which is incorporated herein by reference.

In one embodiment, longer term data storage devices 18a–18b include disk storage devices, each of which may include one or more disk drives, dependent upon the user's requirements and system configuration. Additional embodiments also contemplate various data storage devices including, but not limited to, optical disks, CD ROMS and magnetic tape devices.

In order to improve data processing system performance, a data processing system with the present cache manager does not wait for device controllers 20a–20b to read or write data directly to or from the appropriate data storage device (s) but rather, data to be written to or read from the data storage device(s) is routed through and stored in temporary cache memory 12. The present cache manager is directed to both data storage device read requests by a host system, and write requests from the host to the longer term data storage device. In the preferred embodiment, temporary cache memory 12 includes high speed semiconductor memory whose data is rapidly accessible to both the device controllers 20 and the host adapters 24.

The preferred embodiment of the present invention also includes an index/directory 16 which serves to provide at least an indication of the data which is stored in the cache memory and provide the address or pointer to the data in cache. The index/directory 16 may also serve other functions including containing the address of data on the data storage device, and data which must be written to disk, and may also include other flag or status bits.

The cache index/directory is comprised of one or more device tables such as tables 25a and 25b. In the preferred embodiment, the cache contents index/directory 16 is maintained current by cache manager 10 and is located in the system memory 11.

Figure 2:
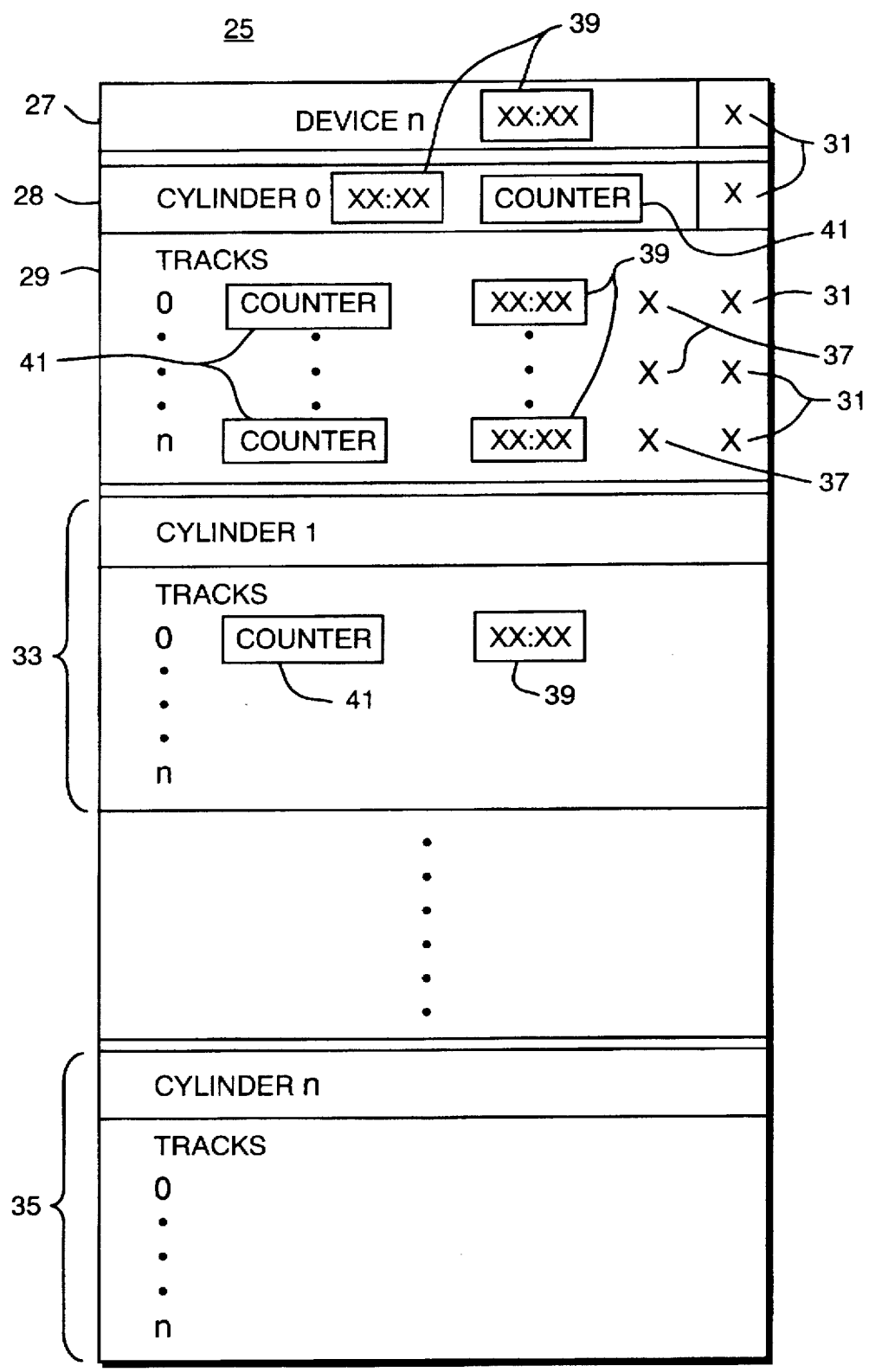
FIG. 2 is a representation of a data storage device cache index/directory table.

The cache contents index/directory 16 is preferably organized on a storage device by storage device basis with one "table" 25, FIG. 2, for each data storage device. Each device table is further organized by device storage elements. For example, for a given longer term data storage device such as a disk drive, a device table 25 includes a device header 27, followed by cylinder 0 header 28, followed by cylinder 0 track information including cache address, time in cache indicators, a number of times accessed indicator, write pending flag bits and other various flag bits indicated generally at 29. Cylinders 1 through N follow with associated disk drive track information 33 and 35 respectively.

For example, each of the device, cylinder, and track entries in the table headers also includes at least a first bit position 31 which if set, indicates that at least, one track in the cylinder, and at least one cylinder on the device is stored in cache. Thus, each cache index/directory table forms a "pyramid" or hierarchy of indices which the present cache manager searches to inquire device-by-device and data storage element by data storage element whether any records or data elements from the storage device are stored in cache.

Also included in each of the track entries is at least a second bit position 37 which is reset once the prefetched track (or record) has been used by the host. The usefulness of this bit will be further described below. Such a device by device cache index/directory is also described in detail in Applicants' copending U.S. patent application Ser. No. 07/586,254 and Applicant's U.S. Pat. No. 5,206,939, both of which are incorporated herein by reference.

Also included within at least each track index 29 is a time indicator 39 which indicates in real time or relative to some other established time or event, the time at which the track, cylinder and/or device data was written to cache, requested by the host, written to a longer term data storage device, retrieved from the data storage device or some other predetermined event or action from which time can be measured.

Further included within at least each cylinder track information index 29 is a counter 41 which is reset to zero when the data element is placed in cache, and incremented, by one, each time data is accessed. Using this counter, the cache manager of the cache management system of the present invention can determine the number of times data has been accessed by reading the contents or value of the counter.

A data storage system incorporating the present cache management system further includes a system manager console 26, FIG. 1. The system manager console 26 allows the user to input the initial default criteria for the cache management system. This allows the user to establish the initial default criteria to optimize the performance of the cache memory by tailoring the cache manager and the cache management system to the particular data storage devices, application programs being executed, or connected host systems.

The cache manager input criteria includes at least three elements namely: (a) the minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory locations containing the previously used tracks or data records are reused or recycled and new data written to these location(s).

The three default or user input criteria required by the cache management system are maintained by the cache manager on each device controller 20 for each data storage device 18 coupled to the controller. Since most processes typically utilize data from only one data storage device, the criteria established for any given data storage device are utilized to control and manage cache for each and every process requesting data from the given data storage device 18.

An example of the above-mentioned initial default cache manager criteria is shown in Table I below for an exemplary device controller I (20a) which controls six disk drives by means of SCSI (Small Computer System Interface) channels 0 through 5.

TABLE I

| Device Controller N | | | | | | |
|---|---|---|---|---|---|---|
| 1. SCSI Drive Number | 0 | 1 | 2 | 3 | 4 | 5 |
| 2. Prefetch (Cache Management) Enable | Y | Y | Y | Y | Y | Y |
| 3. Min Track Seq Threshold | 2 | 2 | 2 | 2 | 2 | 2 |
| 4. Tracks Prefetch Ahead | 2 | 2 | 2 | 2 | 2 | 2 |
| 5. Max Tracks Tail To Cut | 5 | 5 | 5 | 5 | 5 | 5 |

Accordingly, line 2 of the exemplary Table I indicates that prefetching (i.e. cache management) is enabled for all six drives or devices controlled by the device controller. The third line of the Table indicates that each drive has a minimum previously requested sequential track threshold of 2 before a sequential operation is declared.

Figure 3:
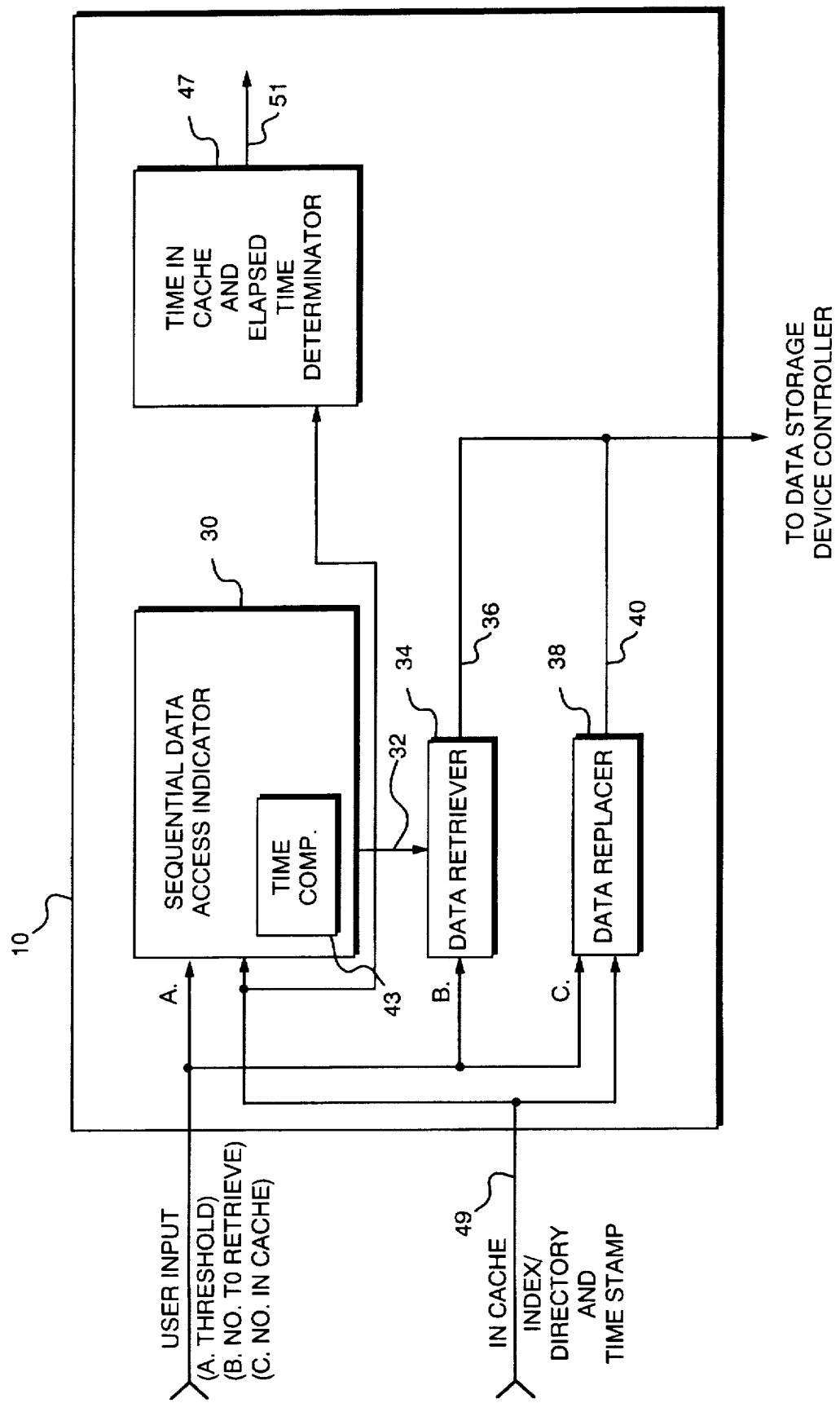
FIG. 3 is a more detailed block diagram of the cache manager of FIG. 1.

The use of such parameters and criteria by the cache manager 10 is shown in greater detail in FIG. 3 wherein the sequential data access indicator 30 utilizes the minimum sequential track threshold input (A), which for this example is 2, and input from the cache contents index/directory including an indication of what data is in cache as well as a time comparison to provide an indication 32 of a sequential data access in progress. Since application programs or "jobs" typically run entirely on one disk drive or other type of longer term data storage device, the data processing manager or user can selectively determine, on a process-by-process basis, the threshold criteria to be established by establishing the initial default criteria for each data storage device.

In addition to using the minimum sequential track in cache threshold, the present invention utilizes the time indication (39, FIG. 2) associated with each track, device, or cylinder in cache and stored in the cache index/directory to provide a determination 32 that a sequential data access is in progress.

Shown below in Table II are representative entries from cache index/directory 16.

TABLE II

| Line | Data Element | In Cache | Time Indication | Sequential Indication |
|---|---|---|---|---|
| 1 | 1 | Yes | 10 | No |
| 2 | 2 | Yes | 11.5 | Yes |
| 3 | 3 | Yes | 12.0 | Yes |
| 4 | N | Yes | 10 | No |
| 5 | N + 1 | Yes | 9 | No |
| 6 | N + 2 | Yes | 13 | No |

As shown in line 1 of this Table, the first data element was placed in cached with a time indication of "10". Although this example uses relative time, real time or other timing indication is contemplated. The second entry at line 2 was placed in cache, retrieved from a data storage device, requested by the host, or other relevant event or status at time 11.5. Using the system and method of the present invention, time comparator 43 of sequential data access indicator 30 compares the two time indicators (or more time indicators if the user established minimum previously requested sequential track threshold is greater than two) by subtracting the second time (11.5) from the first time indication (10).

If the difference is smaller than a pre-established value, a sequential indication 32 is issued. Currently, the pre-established value has been empirically determined as is pre-set at two (2) seconds although other values will undoubtedly prove useful in other situations. Additionally, the present pre-established value is not generally user selectable although user selectability is considered to be within the scope of the present invention.

At line 3, a third data element with a time indication of 12.0 is shown. By comparing the time indication of data element 3 with that of data element 2, the present system and method determines that a difference of less than 2 (the pre-established value) exists, and a sequential indication is given.

At line 4, data element N is shown with a time indication of 10. Since the minimum previously requested track threshold has not been met, no sequential indication 32 is issued. At line 5, data element N+1 is indicated as in cache with a time indication of 9. When the time indication of element N+1 (9) and data element N (10) are compared, the present method and system finds them out of sequence (a negative number) and thus, although prior systems would have issued a sequential data access indication, the present invention can detect that the two physically adjacent data elements were requested randomly, out of sequence, most likely by two different jobs or processes and thus, no sequential access indication is issued.

At line 6, data element N+2 with a time indication of 13 is found. By comparing the time indication of data element N+2 (13) with the time indication of data element N+1 (9) comparator 29 detects a proper sequence but a difference of greater than the preestablished difference of 2 seconds and therefore, no sequential indication is issued, although two data elements are compared above for exemplary purposes, any number can be compared based on the user selectable sequential threshold.

The system and method of the present invention can therefore detect, on a process by process basis, a sequential data access which is taking place by any process which is utilizing the cache memory and data storage system which the present cache manager is monitoring.

Upon receiving an indication 32 that a sequential data access is taking place for a given process, data retriever 34 utilizes the second criteria (B) that is, the maximum number of tracks to prefetch ahead, to provide a request 36 to the appropriate data storage device controller to fetch the next sequential track or other data element for the given process. Since the user knows which processes will be executing on which data storage devices, the initial value of this parameter may be adjusted to maintain a balance between having the proper number of data elements or tracks prefetched versus prefetching too many data elements or tracks. It should be noted that prefetching too many tracks will seriously impact the performance of the data processing system by causing the data storage device controller to spend large amounts of time prefetching data which will not likely be used or will not be used for a long period of time to come and in addition, unused data takes up valuable cache memory space.

Finally, the third parameter (C) is the maximum number of data records to be maintained in cache for this process before the records stored in cache memory for this process are overwritten. Thus, in the present example, Table I indicates that five tracks or data records are maintained in cache before the least recently used (LRU) track or data record is replaced or overwritten in the cache in accordance with a least recently used cache management algorhythm as is well known in the art.

Accordingly, data replacer 38, which forms part of the cache manager 10, receives the third criteria or parameter as well as cache contents index/directory information to provide an indication 40 to the data storage device controller to control the reuse or recycling of previously used cache memory locations allocated to the given process and to reset the in-cache flag or bit associated with the data which is replaced by overwriting.

Figure 4A:
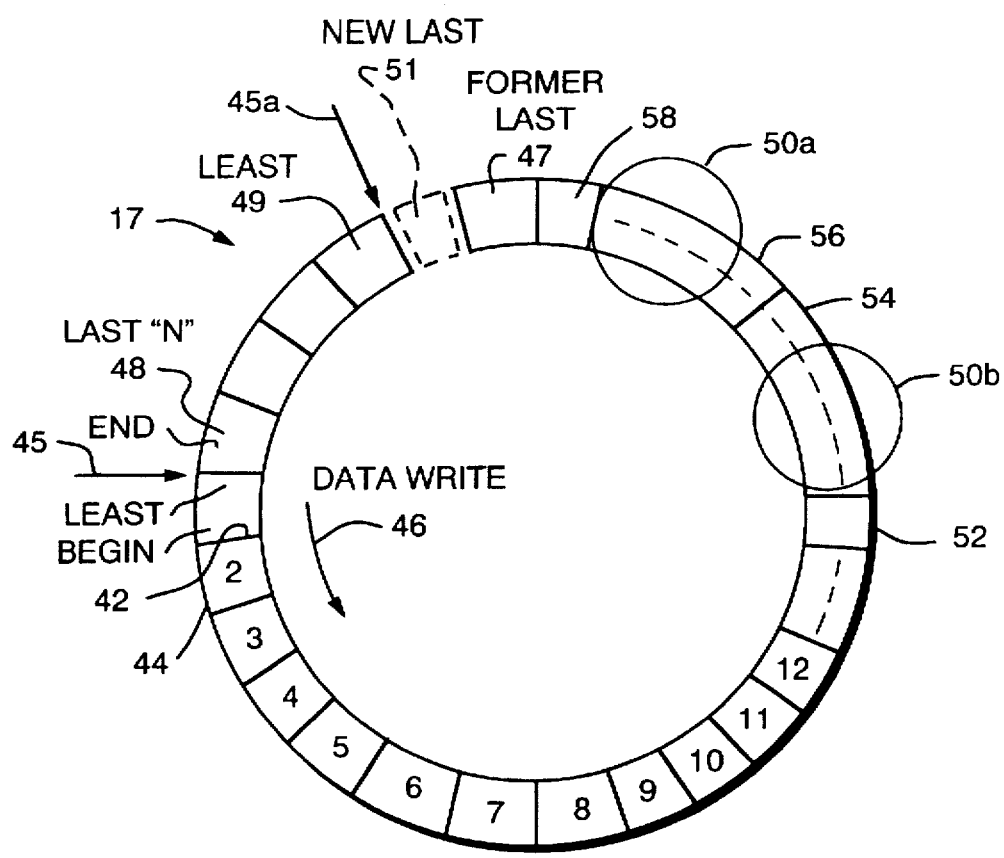
FIGS. 4A–4C illustrate the operation of the present cache manager.
Figure 4B:
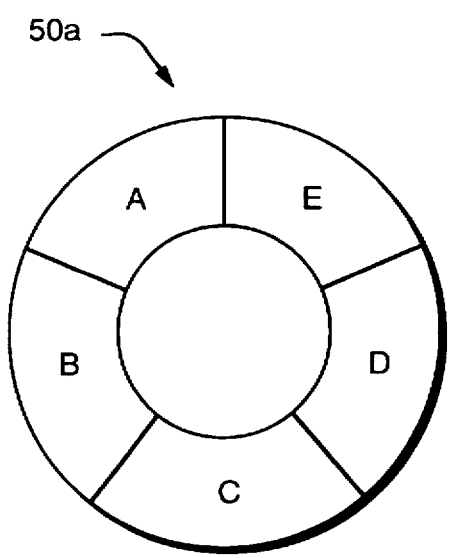
Figure 4C:
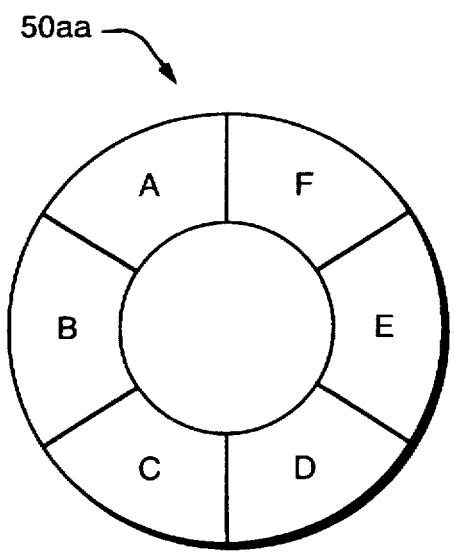
Figure 5:
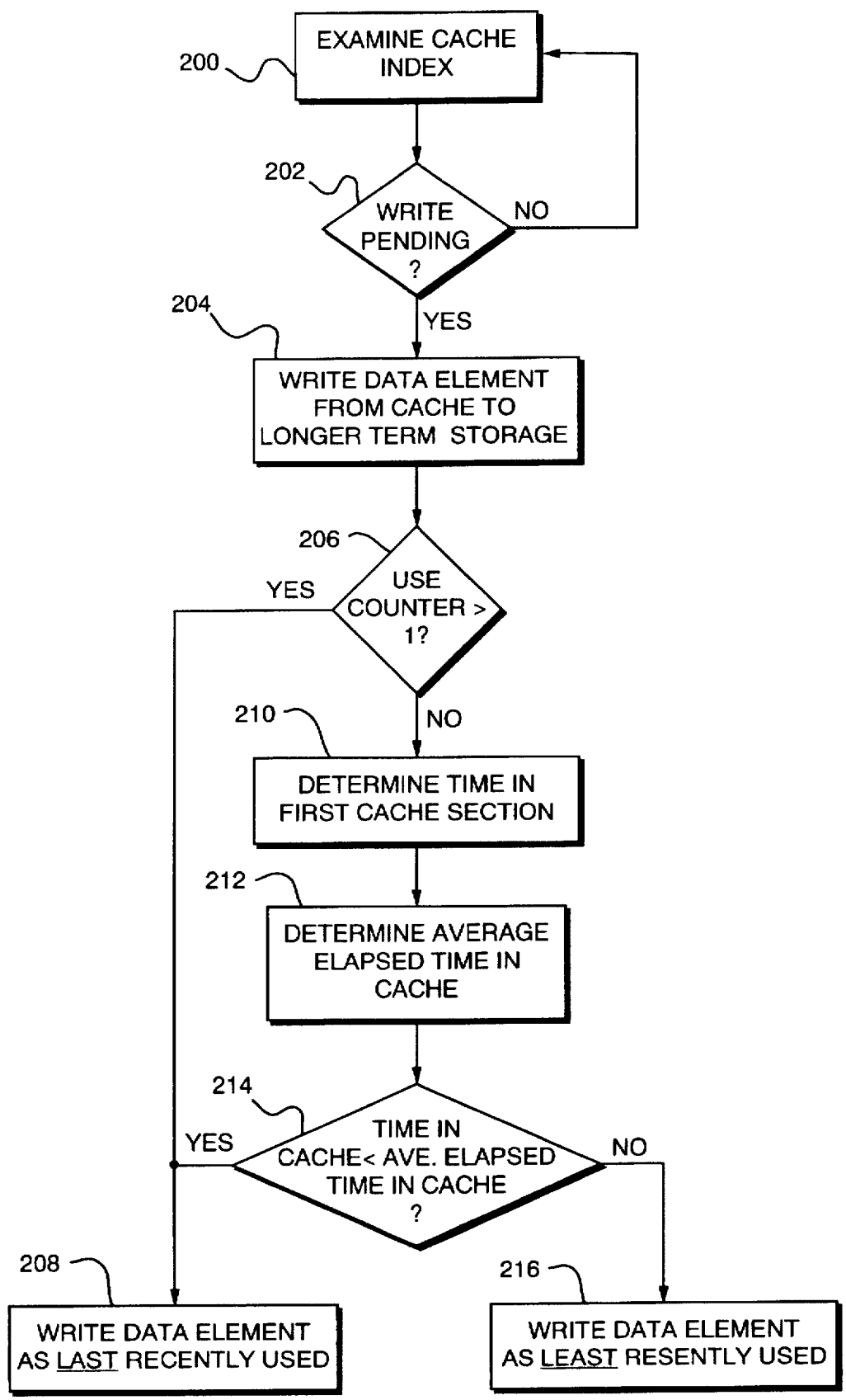

A further illustration useful in describing the present cache manager is shown in conjunction with FIGS. 4A–4C wherein in FIG. 4A, second cache memory Section 17 is shown in a least recently used (LRU) configuration. In such a configuration, which is well known to those skilled in the art, a predetermined number of main memory locations, which number is controllable by the system manager based upon cache usage, is allocated to cache in a "circular" fashion wherein a first (last recently used) data element is written to a logical first or "top" block of memory 42, and a second data record written to the second logical block of memory 44. Cache memory "pointer" 45 always points to the junction between the last recently used memory location (48, for example) and the least recently used location (42, for example).

Writing to cache memory proceeds around the "circular" cache memory in the direction indicated by arrow 46 by moving or incrementing pointer 45. Once data has been written to the last or "N" memory location 48, the cache management system overwrites or recycles the oldest or least recently used (bottom) memory location 42, and continues to overwrite previously used memory locations in sequence.

It is important to note that the cache memory, such as second section 17, is not fixed in size but rather, expands and contracts with usage. The ability of the cache memory to expand and contract allows additional data elements to be inserted into the cache periodically. For example, according to one feature of the present invention, the cache manager must be able to insert data elements between the cache memory "pointer" 45 and a least or last recently used memory storage location.

As previously described in conjunction with FIG. 3, the cache manager of the present invention includes, in addition to a time comparator 43, a time in cache and elapsed time determinator 47. The time in cache and elapsed time determinator 47 is responsive to the cache index directory time indication signal 49 in order to determine the amount of time a data element has spent in the first section 15 of cache memory 12, awaiting writing to a longer term data storage device, as well as the elapsed time it takes for a data element to enter and exit the second section 17 of the cache memory. The comparison signal 53 from the time in cache and elapsed time determinator 47 indicates whether or not the amount of time the data element has spent in the first cache section 15 is less than, greater than or equal to the elapsed or fall through time for the second cache section.

In response to the determination 51 of the time in cache and elapsed time determinator 47, the cache manager and cache management system of the present invention can then determine where to insert the data element in the appropriate cache memory section.

If the time in cache and elapsed time determinator 47 determines that the time a data element has spent in cache is less than the average elapsed time that it takes for a data element to enter and exit second section 17 of the cache memory, as controlled, for exampLe, by an LRU algorhythm, than the cache manager will assume that it is possible that the data element will be utilized again, by the host, within a reasonable period of time and will insert the data element into the cache as a "last" recently used data element, on the logical "top" of the memory.

For example, if cache memory "pointer" 45a is currently pointing to the junction between a last recently used memory location 47 and least recently used memory location 49, and the time in cache and elapsed time determinator 47 determines that a given data element has spent less time in cache, awaiting write pending, than the average elapsed time a data element spends in the cache, than the data element 51 will be inserted between the former last recently used data element 47 and the least recently used data element 49 to become the "new" last recently used data element 51, on the "top" of the cache memory. The least recently used algorhythm, running in the cache management system, will next overwrite or remove the least recently used data element 49 and reuse that location for a new data element being entered into the cache.

Use of the cache memory in such an LRU configuration proceeds until the present cache manager, utilizing the data storage device cache index/directory tables previously disclosed, determines that one or more processes accessing data on any given device has begun a sequential access. When such an indication is provided as shown previously in FIG. 3, the present cache manager establishes micro-cache memory configurations such as 50a and 50b shown in FIG. 4A, one such micro-cache for each sequential access in progress. The memory locations for such micro-cache memory configurations are reserved for use by a particular process from the total number of memory locations 42 available to the main cache memory 12.

The present cache manager reserves memory locations from the main LRU by taking control of one or more LRU cache memory pointers which in essence, prevents the LRU from controlling the cache memory locations now associated with a particular micro-cache memory configuration. Once the present cache manager determines that a micro-cache memory configuration is no longer necessary for a given particular process, the cache manager will return the memory locations to the main LRU by relinquishing or returning control of the pointers to the main LRU algorithm.

When the cache manager reserves such memory locations for use by one or more specific processes, the LRU algorithm utilized to manage the main cache memory 12 will utilize the memory location shown at 52, and subsequently skip those memory locations 50b reserved by the cache manager and then utilize the next available memory locations 54 and 56, before again skipping the next reserved memory locations 50a to utilize the next available memory location 58.

The "size" or number of memory locations allocated to each sequential process is determined by the third criteria or parameter utilized by the cache manager of the present invention namely, the number of blocks to allocate to the process. Thus, as shown in FIG. 4B, micro-cache memory configuration 50a includes five memory locations in this example, presuming that the third criteria was set or defaulted to five.

After detecting a sequential data access in progress by a given process and reserving a micro-cache memory configuration for the process, the cache manager begins by prefetching, one-by-one, a number of data records or tracks as indicated by the second criteria (i.e., the number of tracks or records to prefetch). Thus, the first prefetched record or track will be stored in memory location "A" within the micro-cache memory configuration 50a, while the second prefetched data track or record will be stored at memory location "B". When the host system has requested and read the data at memory location "A", the present cache manager will then prefetch another data record to be stored in memory location "C".

After the host uses the data in memory location "B", the cache manager will prefetch an additional data record and store it in memory location "D". Thus, as is now apparent, with the second criteria namely, the number to prefetch, set at 2, the cache manager of the present invention will continuously keep two unused data records ahead of the last record used or read by the host system. Once memory location "E" has been filled with a data record, the cache manager will then overwrite or reuse the first previously used memory location "A". Thus, the process will continue to utilize the micro-cache memory configuration 50a reserved for this process.

It is important to note that the present cache manager continues to monitor data use by a given process and when an end of a sequential data access by a process is detected by non-use by the host of a data record stored in cache or the lapse of time which exceeds that set by the sequential access indicator, the cache manager will return all of the reserved memory locations of a given micro-cache memory configuration to the main cache memory. Once a sequential operation has been detected, the cache manager, independent of the main cache management control method (whether it be an LRU control method or otherwise), controls the micro-cache memory for any sequential data access taking place by any given process without interference or intervention from the main cache control method.

An additional feature of the cache manager is the ability of the cache manager to monitor each process for which a micro-cache memory configuration has been reserved, and thus to monitor the effectiveness of the cache management control method controlling each and every sequential process, in an attempt to improve on the method.

Thus, the present cache manager is adapted to dynamically change or alter the user specified or default values of the first and second input criteria namely, the sequential access detection threshold, and the number of data tracks or records to prefetch. The third criteria or parameter namely, the size of the micro-cache memory to establish for each process, is not directly dynamically altered but instead, expands or contracts according to the number of tracks or records to prefetch, as will be explained in greater detail below.

Accordingly, the dynamic monitoring and adjustment feature of the present cache manager continuously monitors the cache index/directory once a sequential process has been detected to determine whether the tracks or data records which have been prefetched in anticipation of use by a given process, have in fact been used as anticipated. Since the cache index/directory includes a flag or bit for each data record which is reset once the data record is read or used, the cache manager can easily detect unused but prefetched data records.

Thus, when the dynamic monitoring and adjustment feature of the present cache manager detects many unused tracks or records which were prefetched, the dynamic monitoring and adjustment feature increases the sequential access detection threshold by one. Therefore, a previously set detection threshold of two would be increased to three. If additional unused prefetched data is again detected, indicating that the process may occasionally use three sequential data tracks or records but then not utilize the fourth or fifth sequential record, than the dynamic monitoring and adjustment feature will again increase the sequential access detection threshold by one to four. Thus, as long as the dynamic monitoring and adjustment feature detects unused tracks, the detection threshold will be increased.

Once the dynamic monitoring and adjustment feature of the present cache manager detects a large number or long continuous string of used data records or tracks, the detection threshold is decreased by one each cycle of the dynamic monitoring and adjustment feature, until unused tracks are again detected, thus causing the dynamic monitoring and adjustment feature to again begin increasing the sequential detection threshold. Accordingly, the sequential detection threshold "floats" at the optimum level for any given process. The dynamic monitoring and adjustment feature of the present cache manager is activated or invoked by the present cache manager based upon a threshold of the number of tracks per device which have been pref etched. For example, one implementation of the present invention contemplates invoking the dynamic monitoring and adjustment feature after fifty tracks per device have been prefetched.

The dynamic monitoring and adjustment feature of the present cache manager also monitors and dynamically adjusts the second criteria or parameter namely, the number of data tracks or records to be prefetched. Adjustment of the number of records to prefetch criteria is a function of the formula:

$$Y = \log 2X \quad (1)$$

wherein
Y=the number of data tracks or records to prefetch and
X=the number of previously used sequential tracks or data records.

Thus, as shown in Table III below, an initial default value of 2 data tracks or records to prefetch is not increased until 8 sequential data tracks or records have been prefetched and used. The upper boundary for the number of data tracks or records to prefetch is generally considered to be in the range of ten data tracks or records.

TABLE III

| Records Used | Records to Prefetch |
|---|---|
| 4 | 2 |
| 8 | 3 |
| 16 | 4 |
| 32 | 5 |
| 64 | 6 |
| 128 | 7 |
| 256 | 8 |
| 512 | 9 |
| 1,024 | 10 |

A result of increasing the number of data tracks or records to prefetch is that the dynamic monitoring and adjustment feature of the cache manager of the present invention will allow the size of the micro-cache memory configuration for a given process to fluctuate in size with a corresponding fluctuation in number of data tracks or records to prefetch. Thus, as shown by micro-cache memory configuration 50aa, FIG. 4C, when the process which was previously utilizing micro-cache memory configuratidn 50a, FIG. 4B has its number of data tracks or records to prefetch criteria increased by one, one additional memory location "F" is added to the "loop" to allow for this increased in number of data records. Thus, although the third criteria is not altered, the size of the micro-cache memory configuration servicing any given process is allowed to increase with a corresponding increase in number of data or tracks to prefetch, and to decrease, down to the minimum initial default number specified for the device, with subsequent decreases in number of data tracks or records to prefetch.

The present invention features a method for utilizing the amount of time the data element has spent in cache and the number of times the data element has been accessed in order to determine in what position to place the data element in the second section of cache memory, awaiting removal or replacement.

The method for controlling the contents of cache memory first begins by examining the cache index to determine if any data elements must be written to a longer term data storage device, step 202. If there are no write pending data elements, the method of the present invention continues to examine the next cache index. If there are data elements, indexed by the cache index, that require writing to a longer term data storage device, the method of the present invention next causes the data element to be written from cache to a longer term data storage device, step 204.

After the data element is copied from cache to the longer term data storage device, the method of the present invention examines the use or access counter, step 206, to determine how many times the data element has been accessed while waiting to be written to longer term data storage. If an examination of the use or access counter indicates that the data element was used more than once while stored in cache and awaiting writing to a longer term data storage device, the method of the present invention writes the data elements into cache memory as the last recently used data element without regard or without determination as to how long the data element has been in cache. The reason for not looking at the elapsed time and time period in such a situation is that since the data element has been used more than once while in cache, it is likely that the data element will be used again and it should be stored in the top most position of the second segment of the cache so as to be sure that it will remain in the cache as long as possible, thus allowing a host or process requiring access to the data as much opportunity as possible to access the data while it is still in cache, before the data must be read from a longer term data storage medium.

If, at step 206, it is determined that the usage or access counter of the data element is not greater than one, the system and method of the present invention next determines the amount of time the data element has spent in the first section of the cache, awaiting writing to disk, at step 210. At step 212, the system and method next determines the average elapsed time that a data element spends in the second section 17 of the cache memory. Using the elapsed time that it takes for a data element to be inserted into the top of the cache and be discarded or removed by the least recently used algorhythm ensures that the system and method of the present invention give as much time as possible to a data element to remain in cache.

In the preferred embodiment of the present invention, it is contemplated that the determined average elapsed time will be further multiplied by two and a comparison made with the multiplied number versus the amount of time a data element has spent in cache in order to be certain that data, which should remain in cache, is not removed prematurely.

At step 214, the system and method of the present invention next compares the amount of time a data element has spent in cache with the average (or two times) elapsed time a data element has been in cache. If the time a data element has spent in cache is less than the average elapsed time, or less than some other formula using the average elapsed time, than the data element is written as the last recently used data element in the cache, step 208. If, however, the amount of time a data element has spent in cache is already greater than the average elapsed time that a data element spent in cache, chances are that the data element will not be used again in a reasonable period of time and accordingly, it is written as a least recently used data element, step 216, to be shortly removed or written over by the least recently used algorhythm.

Figure 6:
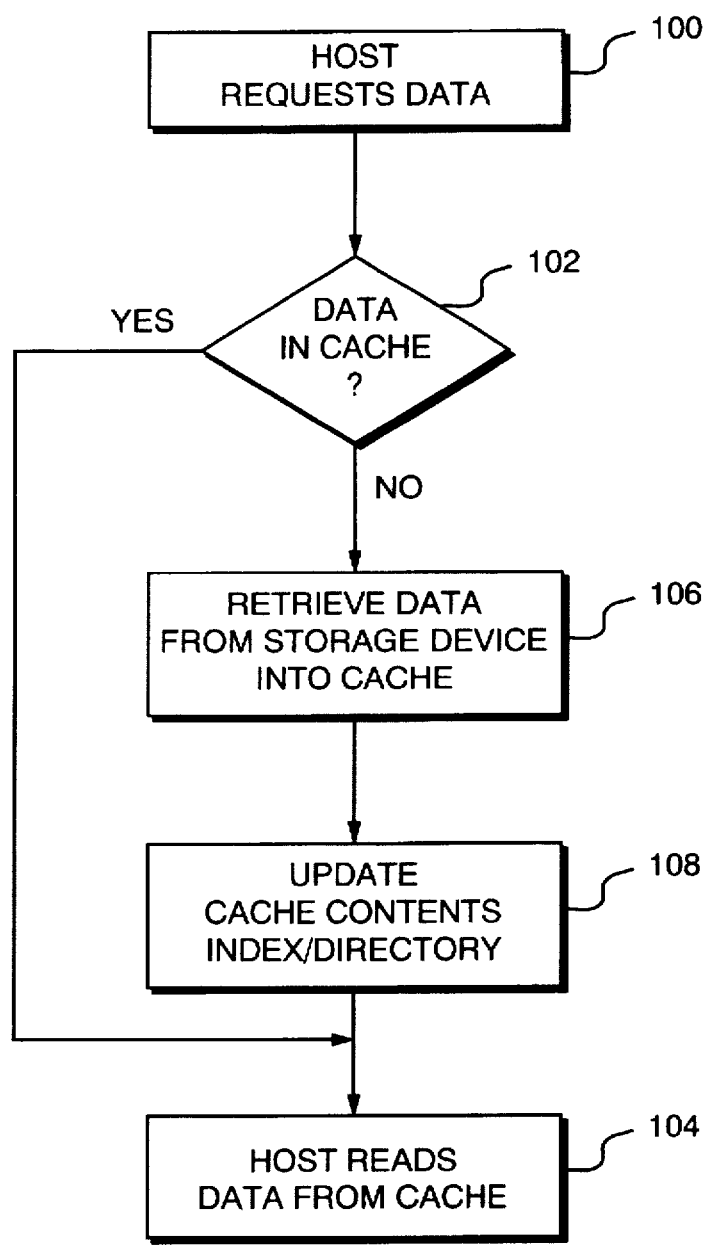
FIG. 6 is a flowchart illustrating data access by a host coupled to a data processing system incorporating the present cache management system and method.

A further method for monitoring and controlling the contents of cache memory utilizing the cache manager is also disclosed. The method includes requesting data by at least one host coupled to the system step 100, FIG. 6 followed by determination by the host adapter of whether the requested data is in cache, step 102. If the requested data is in cache memory, the host reads the data from cache, step 104.

If, at step 102, a determination is made that the data is not in cache, the host controller instructs the device controller to retrieve the data from the data storage device. The retrieved data is stored in cache memory, step 106 and the cache contents index directory updated, step 108.

Figure 7:
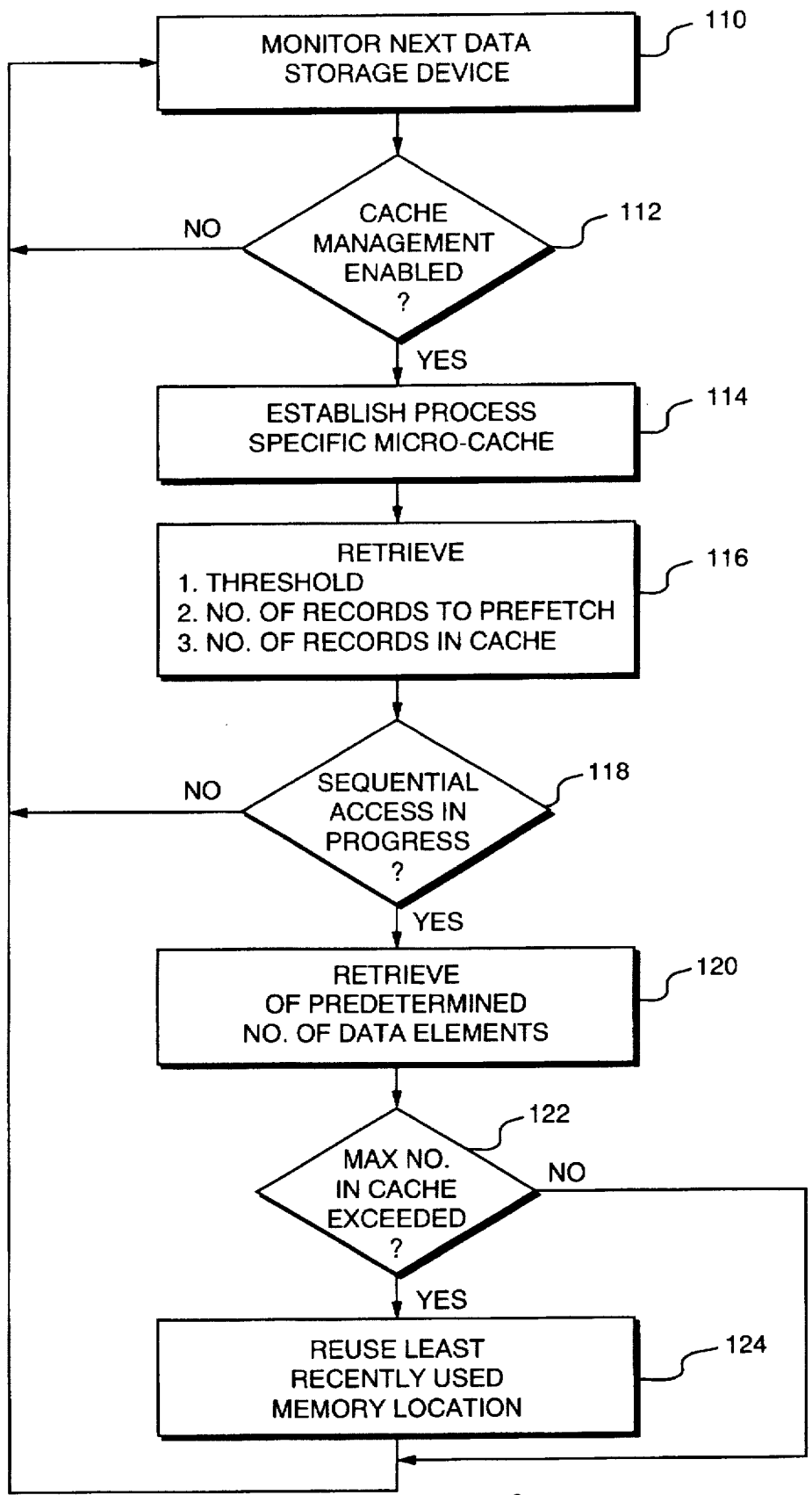
FIG. 7 is a flowchart illustrating the operation of the present cache management system.

Continuously and generally concurrently with the host requesting data from one or more data storage devices, the present cache manager monitors a first data storage device, step 110, FIG. 7, and verifies that the user has enabled cache management for the particular data storage device, step 112. One or more process specific micro-caches are established for this device, step 114. Three parameters are next retrieved, namely (1) the sequential access threshold; (2) the maximum number of data elements to be prefetched; and (3) the maximum number of sequential data elements to be maintained in cache for this particular process, step 116.

After the in cache and used flags of the cache index/directory for the given data storage device being monitored are scanned and utilizing the time stamp or indication stored in the cache index/directory, the sequential data access indicator determines whether or not a sequential data access is in progress, step 118. If a sequential data access is not in progress by any given process on the device being presently monitored, another data storage device is monitored.

If, at step 118, the sequential data access indicator indicates that a sequential data access is in progress by at least one process accessing the data storage device, the method utilizing the cache manager of the present invention proceeds to step 120 to retrieve, one data element or track at a time, up to the predetermined maximum number of data elements or tracks to be prefetched as established by the second criteria.

At step 122, a determination is made as to whether the maximum number of data elements in cache selected by the user as the third parameter has been exceeded. If this maximum number will not be exceeded by storing in the micro-cache of a particular process the current prefetched data element or track, the data element or track is written to the next.sequential micro-cache memory location. If however, at step 122, the system determines that the maximum number of sequential data elements in cache will be exceeded by writing the given data element or track to the process's micro-cache, the present method replaces or re-uses the least recently used memory location in the micro-cache, step 124. Subsequently, another data storage device is monitored, step 110.

Figure 8:
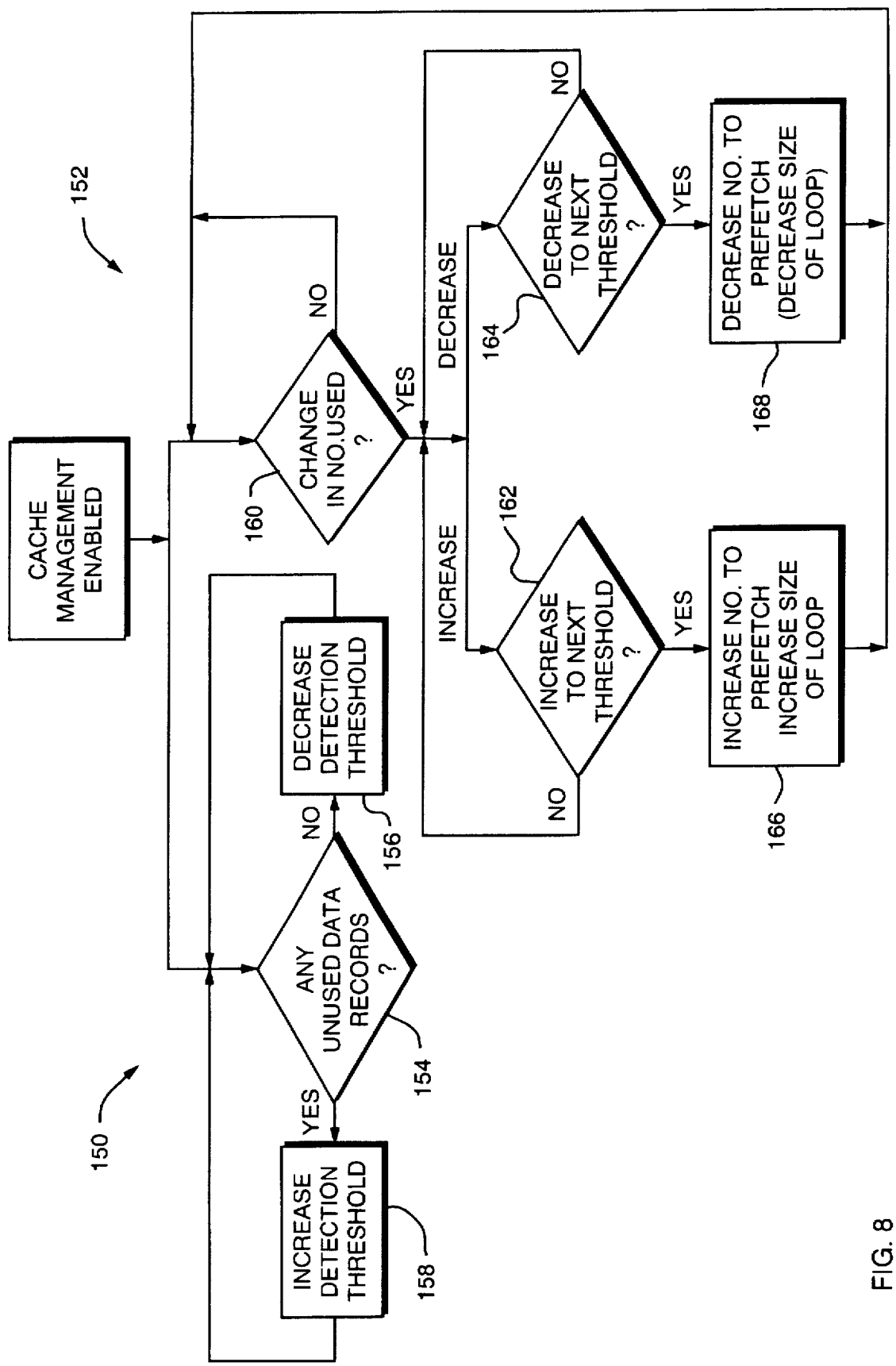
FIG. 8 is a flowchart illustrating the operation of the dynamic monitoring and adjustment feature of the present cache manager.

A further feature of the present invention is the dynamic monitoring and adjustment feature of the cache manager of the present invention as previously described. FIG. 8 is a flowchart which illustrates the two parallel and generally simultaneous dynamic monitoring and adjustment procedures 150, 152 undertaken by this feature of the present invention if cache management is enabled for at least one data storage device coupled to the system.

As shown in the dynamic monitoring and adjustment procedure 150, the method of dynamically monitoring and adjusting the cache management parameters includes sequentially monitoring the cache index/directory data used flags for each data storage device to detect any unused data tracks or records, step 154. If no unused data records or tracks stored in cache memory are detected, the dynamic monitoring and adjustment procedure decreases the sequential access detection threshold (the first parameter), step 156, and returns to monitor for any unused data records for the next device. If, however, the procedure detects any unused data tracks or records at step 154, the procedure continues to step 158 wherein the sequential access detection threshold (the first parameter) is increased by one, with the procedure returning to monitor the device cache index/directory for any additional unused data tracks or records.

Generally simultaneously with and in parallel with the monitoring procedure described above, the dynamic monitoring and adjustment feature of the cache manager also executes the procedure indicated generally by 152 which includes monitoring the cache index/directory for any change in the total number of used sequential data tracks or records which were prefetched by any given process executing on the device, step 160. If no change in the total number of used records or tracks is detected, no adjustments to the cache manager criteria are made.

If, however, a change in the total number of tracks or records is detected at step 160, the dynamic monitoring and adjustment feature proceeds to one of steps 162 in the case of an increase in the total number of data tracks or records used, or to step 164 in the case of a decrease in the total number of data tracks or records used.

In the case of an increase in the total number of data tracks or records used, the dynamic monitoring and adjustment feature of the present cache manager determines at step 162 if the increase in the total number of data tracks or records used has reached the next threshold as previously described in conjunction with Table I. If the increase has reached the next threshold, processing continues to step 166, wherein the second criteria of the cache manager namely, the number of data tracks or records to prefetch is increased by one. In addition, the third criteria namely, the number of data records or tracks to maintain in the micro-cache "loop" for the given process is also increased by one with processing returning to step 160 to detect any change in the total number of data tracks or records used.

If a decrease in the total number of data tracks or records used is detected at step 160, the dynamic monitoring and adjustment feature of the present cache manager determines at step 164 if the total number of data tracks or records has decreased to the next threshold and if so, processing continues to step 168 wherein the number of data tracks or records to prefetch (the second criteria) of the cache manager is decreased by one. Also at this step in the procedure, the actual number of memory locations in the processes micro-cache memory "loop" will also be decreased by one if it currently exceeds the predetermined number of memory locations established by the user as the third criteria or parameter. Subsequently, processing returns to step 160 to monitor and detect any change in total number of unused data tracks or records.

Accordingly, the system and method of the present invention provide a reliable, accurate and low overhead cache management system including a sequential access indicator which is based not only on merely the number of data elements or tracks which are requested by a given host or process but more importantly, on the relative time between a given event or status of two physically adjacent data elements or tracks stored in cache memory.

Modifications and substitutions by one of ordinary skill in the art are considered to be within the scope of the present invention which is not to be limited except by the claims which follow.

What is claimed is:

1. In a cache for a computer system for storing data elements in a first cache section and a second cache section, the data elements in the second section including least recently used and last recently used data elements, a computer implemented method of controlling the contents of the second cache section comprising the steps of:

(A) determining the amount of time a first data element was resident in the first cache section;

(B) determining the average elapsed period of time at least a second data element is resident in the second cache section;

(C) comparing the amount of time determined in step (A) with the period of time determined in step (B); and, (D) if the amount of time determined in step (A) is greater that the period of time determined in step (B), placing the first data element from the first cache section into the second cache section as a least recently used data element.

2. The method of claim 1, further comprising the step of:

(E) if the amount of time determined in step (A) is less than the period of time determined in step (B), placing the first data element from the first cache section into the second cache section as a last recently used element.

3. The method of claim 2, further comprising the stepwise movement of the data element placed in the second cache section as a last recently used element to the least recently used element before the data element is discarded in accordance with a least recently use (LRU) routine.

4. The method of claim 2, further including the step of overwriting the least recently used data element when the first data element is placed in the second cache section as the last recently used data element.

5. The method of claim 2 wherein step (B) further comprises the step of determining, for a plurality of data elements, an average period of time that elapses between a data element being inserted in said second cache memory section as a last recently used data element and said data element being removed from said second cache memory section as the least recently used data element.

6. The method of claim 1, further including the step of discarding the data element which meets the requirement of step (D) from the second cache section in accordance with a least recently used (LRU) routine.

7. The method of claim 1, wherein the first cache section contains data elements awaiting writing to a data storage device and the second cache section contains data elements which have been written to the data storage device.

8. The method of claim 1, wherein the average elapsed period of substep (B) includes determining the elapsed time from the time a data element is inserted in the second cache section as a last recently used data element and the data element is removed from the second cache section as the least recently used data element.

9. The method of claim 1 further comprising the step of determining the number of times each a data element in the first cache section has been read, and wherein, if the number of times the data element has been read exceeds one, the data element is placed in the second cache section as a last recently used element without a comparison of the average amount of time that elapses with the period of time the data element was stored in the first data cache.

10. In a cache for a computer system, the cache storing data elements in a first cache section and a second cache section, the data elements in the second section including least recently used and last recently used data elements, apparatus for controlling the contents of the second cache section comprising:

(A) means for determining the amount of time a first data element was resident in the first cache section;

(B) means for determining the average elapsed period of time at least a second data element is resident in the second cache section;

(C) means for comparing the amount of time determined in step (A) with the period of time determined in step (B); and, (D) if the amount of time determined in step (A) is greater that the period of time determined in step (B), means for placing the first data element from the first cache section into the second cache section as a least recently used data element;

11. The cache of claim 10, further comprising:

(E) if the amount of time determined by the means for determining in (A) is less than the period of time determined by the means for determining in (B), means for placing the first data element from the first cache section into the second cache section as a last recently used element.

12. The cache of claim 11, frther comprising means for providing the stepwise movement of the data element placed in the second cache section as a last recently used element to the least recently used element before the data element is discarded in accordance with a least recently use (LRU) routine.

13. The cache of claim 11, further including means for overwriting the least recently used data element when the first data element is placed in the second cache section as the last recently used data element.

14. The cache of claim 11 further comprising means for determining, for a plurality of data elements, an average period of time that elapses between a data element being inserted in said second cache memory section as a last recently used data element and said data element being removed from said second cache memory section as the least recently used data element.

15. The cache of claim 10, further including means for discarding the data element which meets the requirement of D) from the second cache section in accordance with a least recently used (LRU) routine.

16. The cache of claim 10, wherein the first cache section contains data elements awaiting writing to a data storage device and the second cache section contains data elements which have been written to the data storage device.

17. The cache of claim 10, wherein the means for determining the average elapsed period of (B) includes means for determining the elapsed time from the time a data element is inserted in the second cache section as a last recently used data element and the data element is removed from the second cache section as the least recently used data element.

18. The cache of claims further comprising means for determining the number of times each a data element in the first cache section has been read, and wherein, if the number of times the data element has been read exceeds one, the data element is placed in the second cache section as a last recently used element without a comparison of the average amount of time that elapses with the period of time the data element was stored in the first data cache.

* * * * *